United States Patent [19]
Laird et al.

[11] Patent Number: 6,074,730
[45] Date of Patent: Jun. 13, 2000

[54] BROAD-BAND ANTIREFLECTION COATING HAVING FOUR SPUTTERED LAYERS

[75] Inventors: Ronald E. Laird, Oakley; Charles K. Carniglia, Antioch, both of Calif.

[73] Assignee: The BOC Group, Inc., Murray Hill, N.J.

[21] Appl. No.: 09/001,974

[22] Filed: Dec. 31, 1997

[51] Int. Cl.⁷ .................................................. B32B 7/00
[52] U.S. Cl. .................. 428/212; 359/580; 359/586; 359/587; 359/588; 428/216; 428/697; 428/699; 428/701; 428/702
[58] Field of Search ..................... 428/216, 212, 428/697, 699 C, 701, 702; 359/580, 586, 587, 588

[56] References Cited

U.S. PATENT DOCUMENTS

| | | |
|---|---|---|
| 2,281,474 | 4/1942 | Cartwright et al. . |
| 2,478,385 | 8/1949 | Gaiser . |
| 2,782,676 | 2/1957 | Osterberg . |
| 3,185,020 | 5/1965 | Thelen . |
| 3,235,397 | 2/1966 | Millendorfer . |
| 3,432,225 | 3/1969 | Rock . |
| 3,463,574 | 8/1969 | Bastien et al. . |
| 3,604,784 | 9/1971 | Louderback et al. . |
| 3,712,711 | 1/1973 | Adachi . |
| 3,761,160 | 9/1973 | Apfel et al. . |
| 3,781,090 | 12/1973 | Sumita . |
| 4,046,659 | 9/1977 | Cormia et al. . |
| 4,128,303 | 12/1978 | Onoki et al. . |
| 4,166,018 | 8/1979 | Chapin . |
| 4,313,647 | 2/1982 | Takazawa . |
| 4,356,073 | 10/1982 | McKelvey . |
| 4,422,916 | 12/1983 | McKelvey . |
| 4,568,578 | 2/1986 | Arfsten et al. ........................ 428/432 |
| 4,921,760 | 5/1990 | Tani et al. . |
| 4,990,234 | 2/1991 | Szczyrbowski et al. . |
| 5,047,131 | 9/1991 | Wolfe et al. . |
| 5,091,244 | 2/1992 | Biornard . |
| 5,105,310 | 4/1992 | Dickey . |
| 5,262,633 | 11/1993 | Kasai et al. . |
| 5,270,858 | 12/1993 | Dickey . |
| 5,362,552 | 11/1994 | Austin . |
| 5,372,874 | 12/1994 | Dickey et al. . |
| 5,407,733 | 4/1995 | Bjornard et al. . |
| 5,450,238 | 9/1995 | Bjornard et al. . |
| 5,460,888 | 10/1995 | Hashimoto et al. . |
| 5,520,996 | 5/1996 | Balian et al. ........................ 428/701 |
| 5,579,162 | 11/1996 | Bjornard et al. . |
| 5,667,880 | 9/1997 | Okaniwa . |
| 5,891,556 | 4/1999 | Anderson et al. ................... 428/216 |

FOREIGN PATENT DOCUMENTS

| | | |
|---|---|---|
| 0 520 720 | 12/1992 | European Pat. Off. . |
| WO 94/19709 | 2/1994 | WIPO . |

OTHER PUBLICATIONS

Strong, John; "On a Method of Decreasing the Reflection from Nonmetallic Substances"; *J.Opt.Soc.Am.,* vol. 26; Jan., 1936; pp. 73–74.

Lockhart, Luther B., Jr., et al.; "Three–Layered Reflection Reducing Coatings"; *J.Opt.Soc.Am.;* vol. 37, No. 9; Sep., 1947; pp. 689–694.

Young, Leo; "Antireflection Coatings on Glass"; *Applied Optics;* vol. 4, No. 3; Mar. 1965; pp. 366–367.

Musset, A. et al.; "Multilayer Antireflection Coatings"; *Progress in Optics* 8; 1970; pp. 201–237.

Apfel, Joseph H.; "Graphics in Optical Coating Design"; *Applied Optics;* vol. 11, No. 6; Jun. 1972; pp. 1303–1312.

(List continued on next page.)

*Primary Examiner*—Archene Turner
*Attorney, Agent, or Firm*—Philip H. Von Neida; Salvatore P. Pace

[57] ABSTRACT

A broad-band multilayer antireflection coating comprising four layers designed for deposition in an inline magnetron sputtering machine. The optical thickness of the third layer from the substrate is less than one quarter of a wavelength in the center of the low-reflection band, and the second and fourth layers are made of silicon dioxide.

51 Claims, 10 Drawing Sheets

OTHER PUBLICATIONS

Baumeister, Philip, et al.; "Application of linear programming to anti–reflection coating design"; *J.Opt.Soc.Am.;* vol. 67, No. 8; Aug. 1977; pp. 1039–1045.

Carniglia, C.K.; "Oxide Coatings for One Micrometer Laser Fusion Systems"; *Thin Solid Films;* 77 (1981); pp. 225–238.

Laird, R.E. et al.; "Durable Conductive Anti–Reflection Coatings for Glass and Plastic Substrates"; *Soc. of Vacuum Coaters,* 39th Annual Technical Conference Proceedings; 1996; pp. 361–365.

Ishikawa, Hiro, et al.; "Two Layer Broad Band AR Coating"; *Proceedings of Tenth International Conference on Vacuum Web Coating;* Nov. 12, 1996; pp. 221–233.

Zheng, Yanfei, et al.; "Two–layer wideband antireflection coatings with an absorbing layer"; *Applied Optics;* vol. 36, No. 25; Sep. 1, 1997; pp. 6335–6338.

Schroeder, H.; "Oxide layers Deposited from Organic Solutions"; *Physics of Thin Films;* Georg Hass and Rudolf E. Thun, eds.; vol. 5; 1969; pp. 87–141.

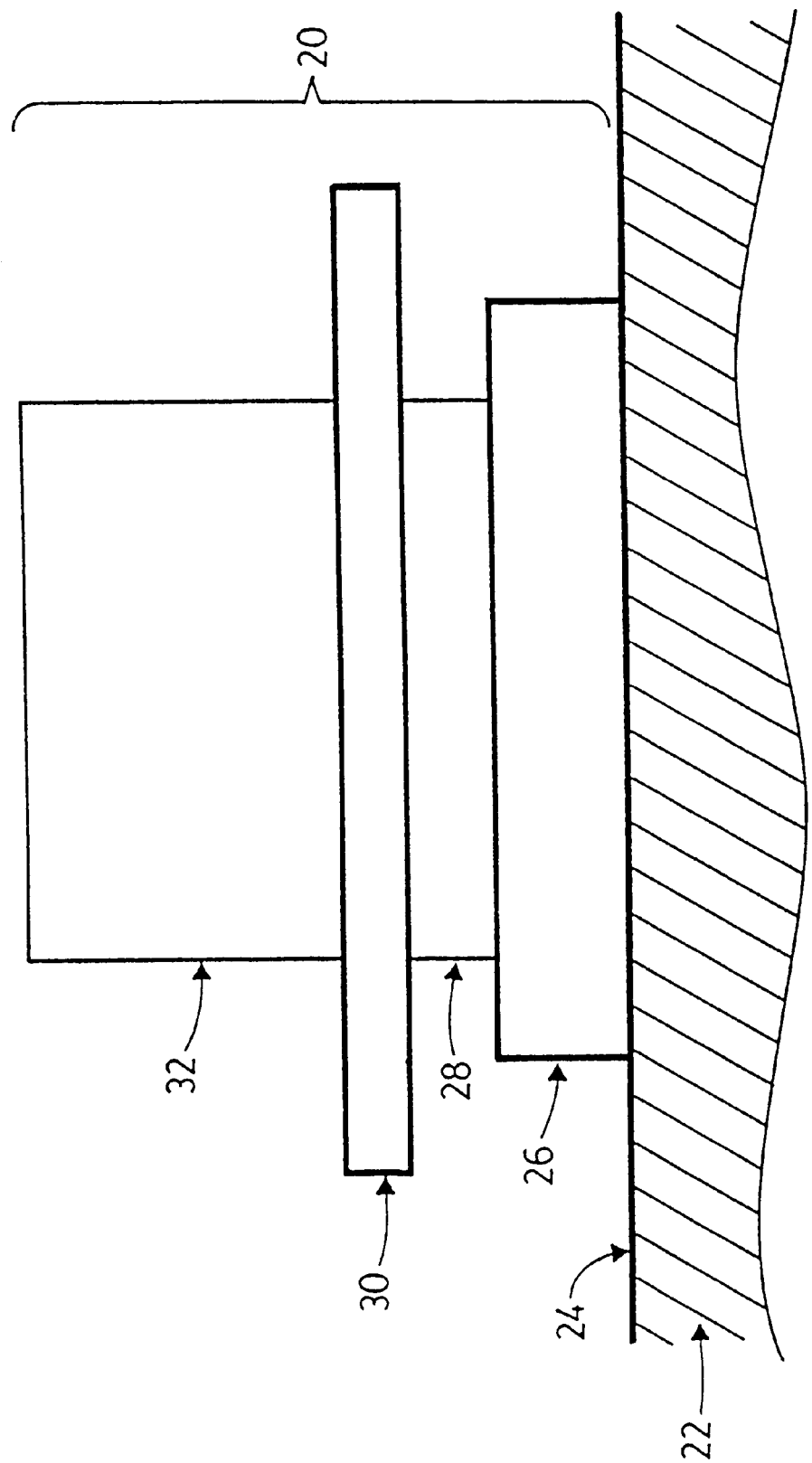
FIG._1.

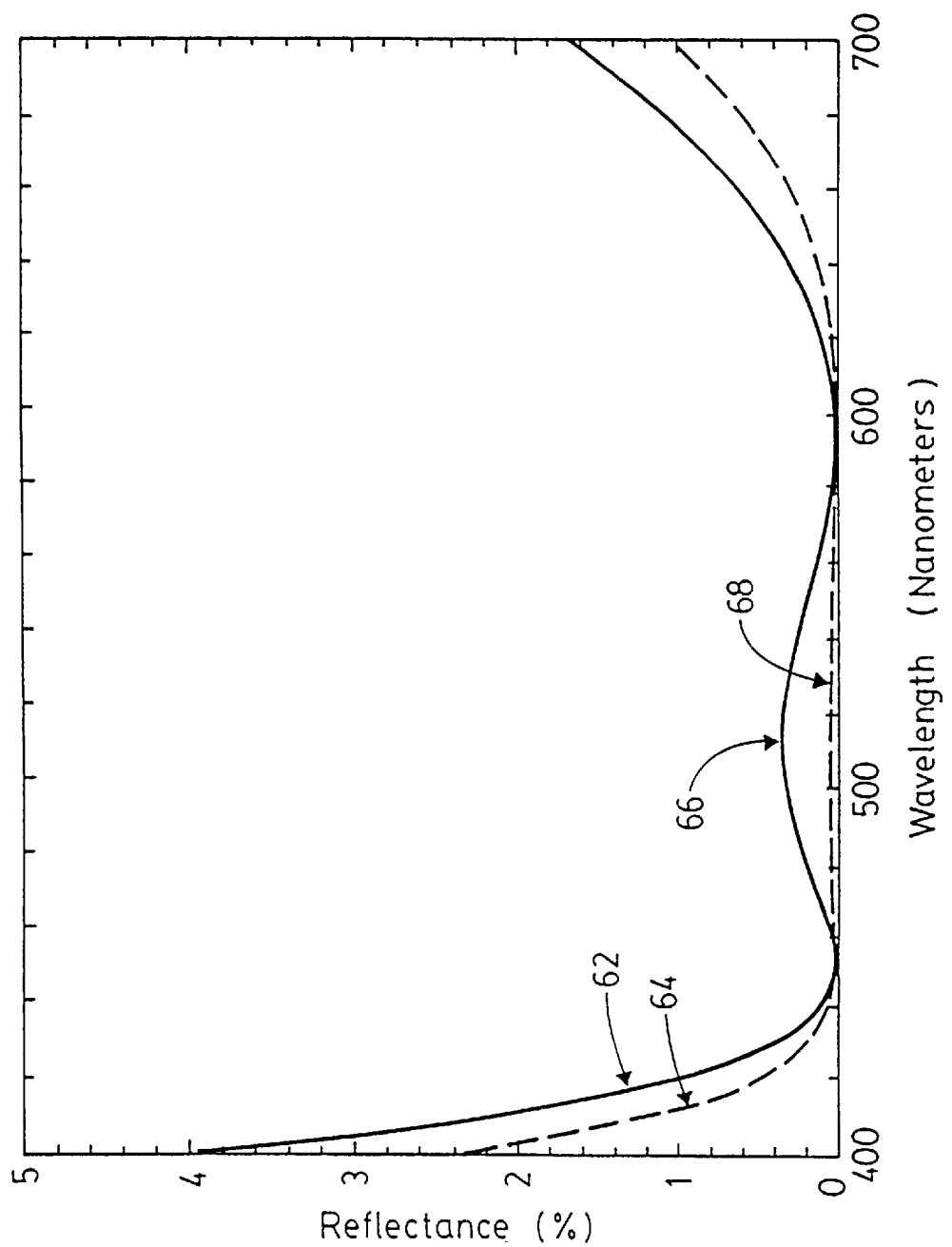

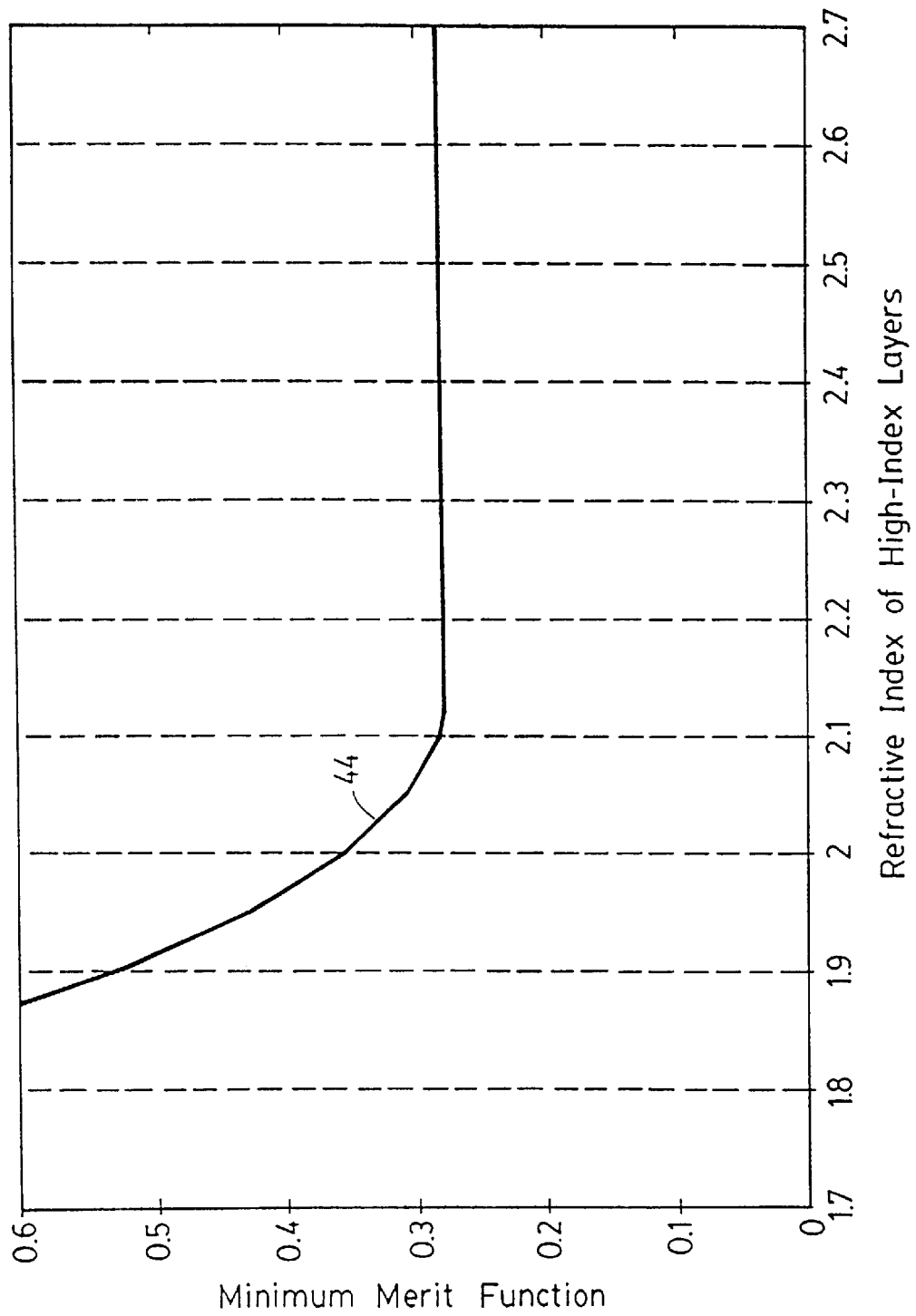
FIG._3.

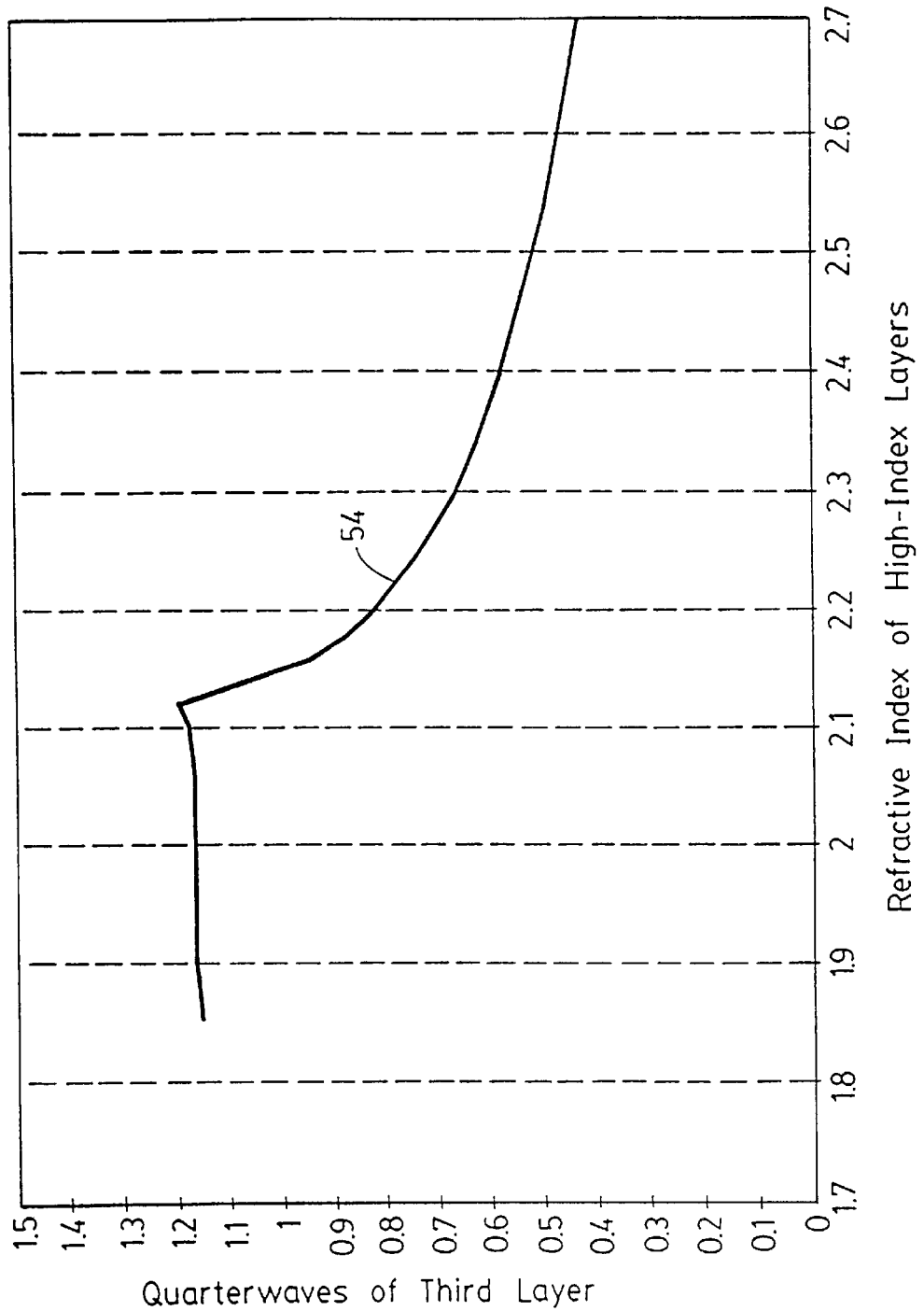
FIG._4.

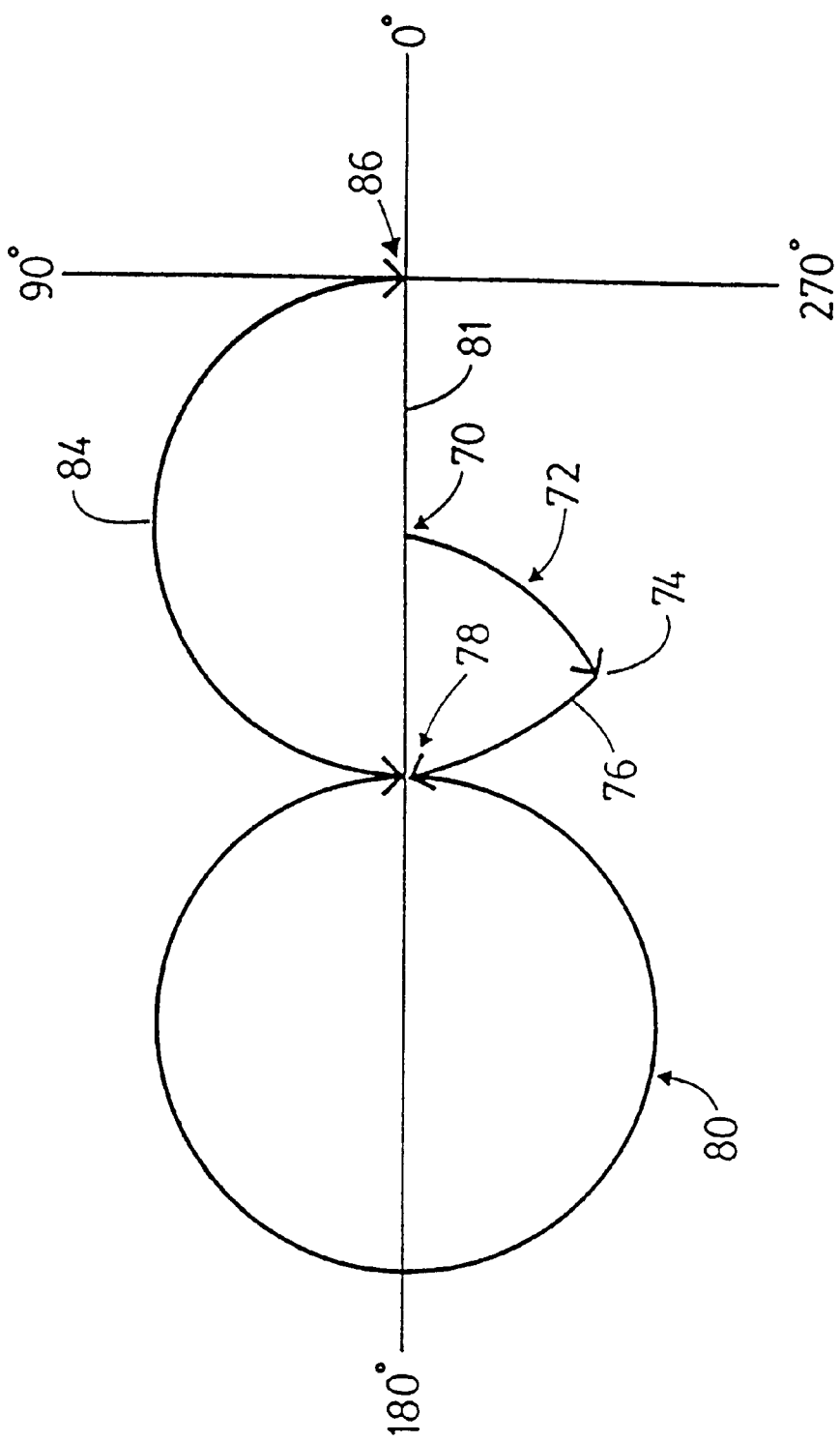
FIG._5.
(PRIOR ART)

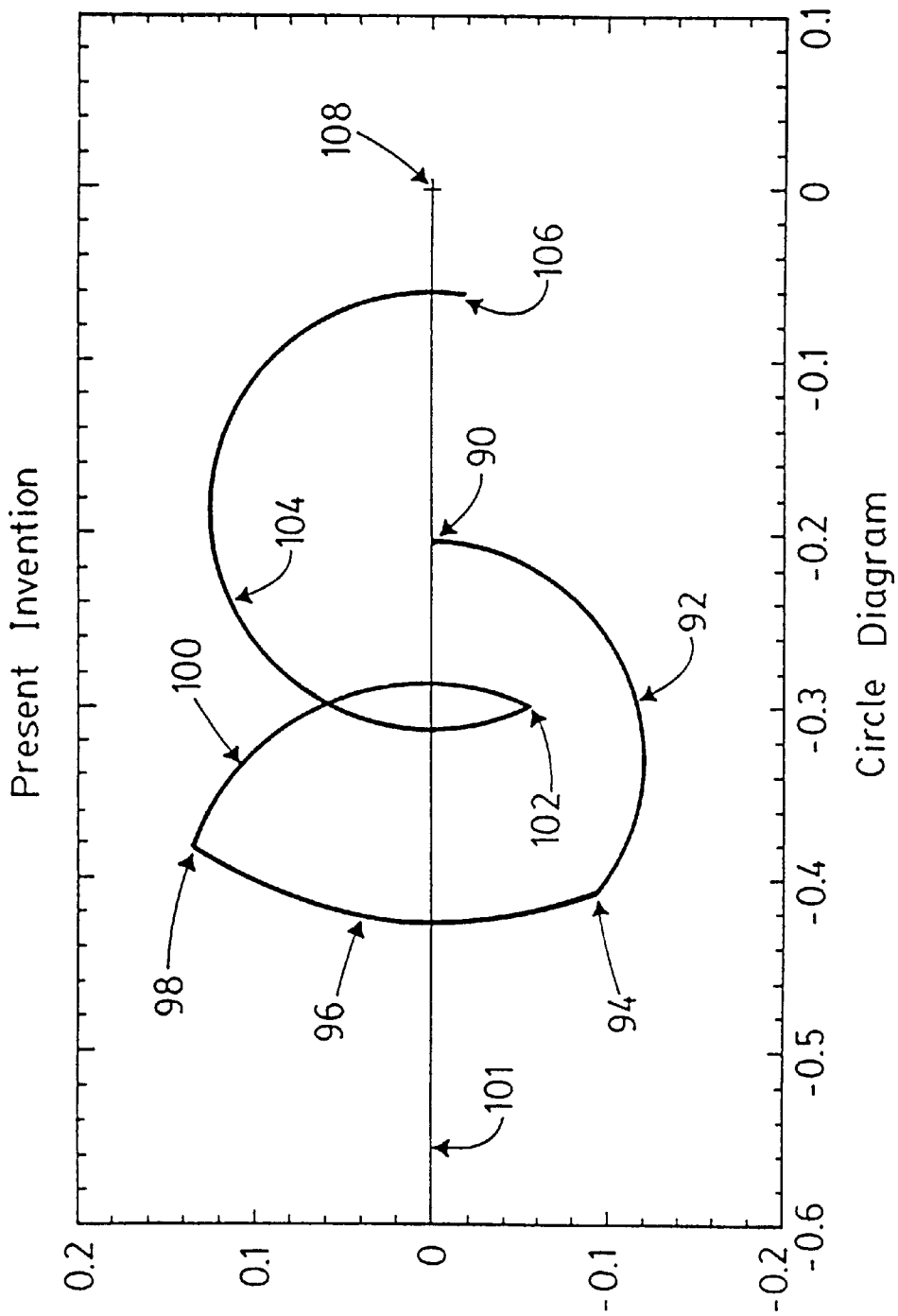
FIG._6.

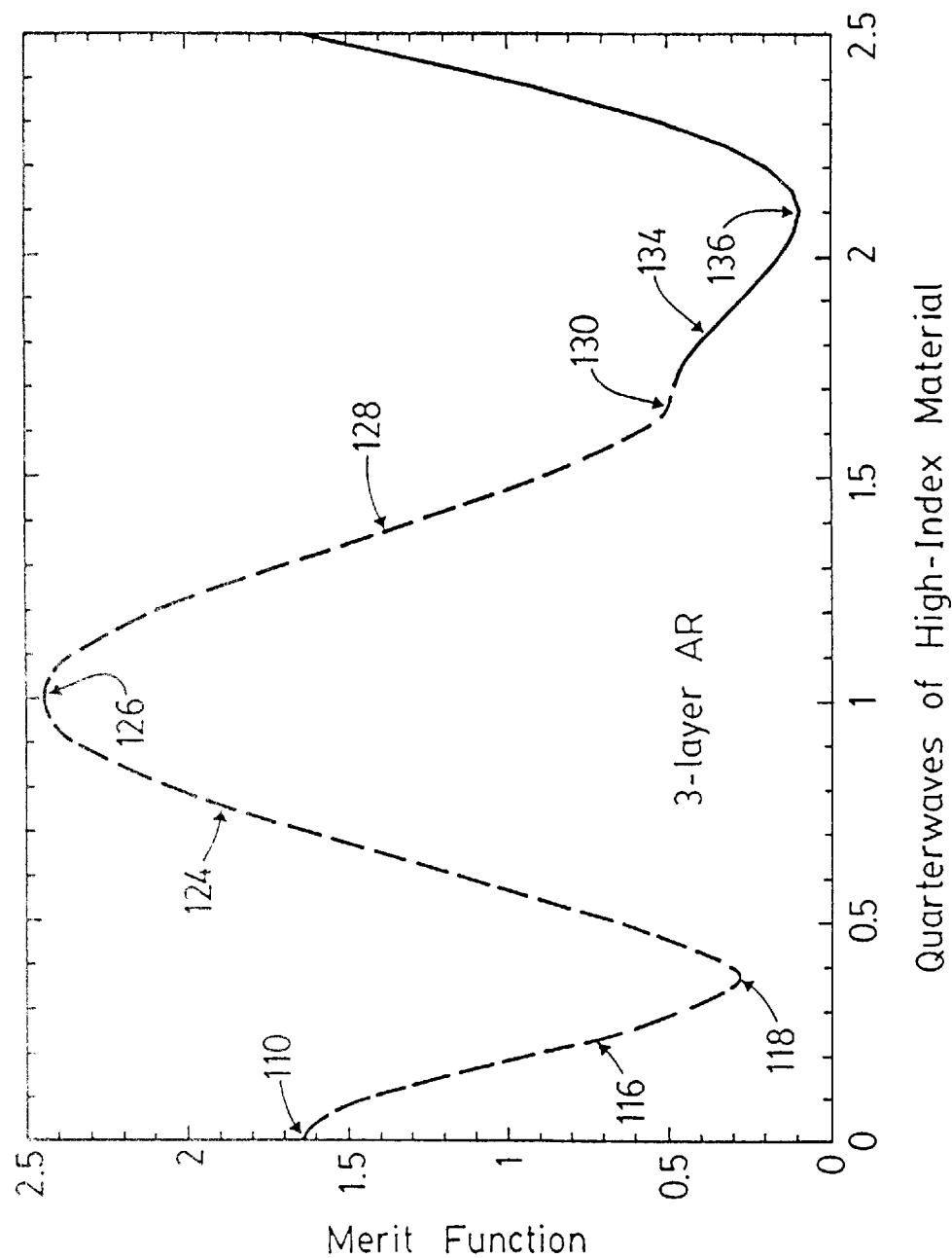
FIG._7.

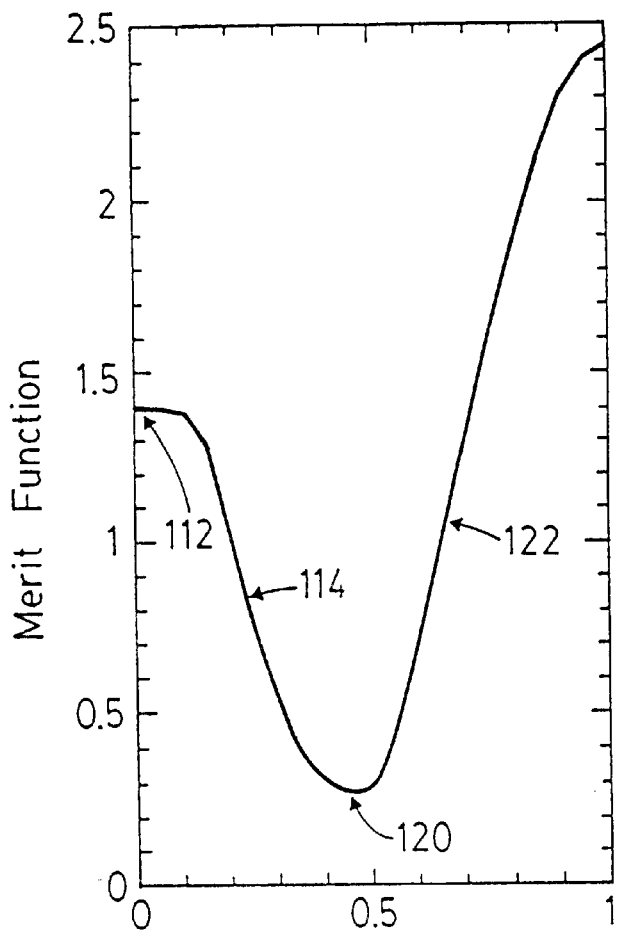
FIG._8.
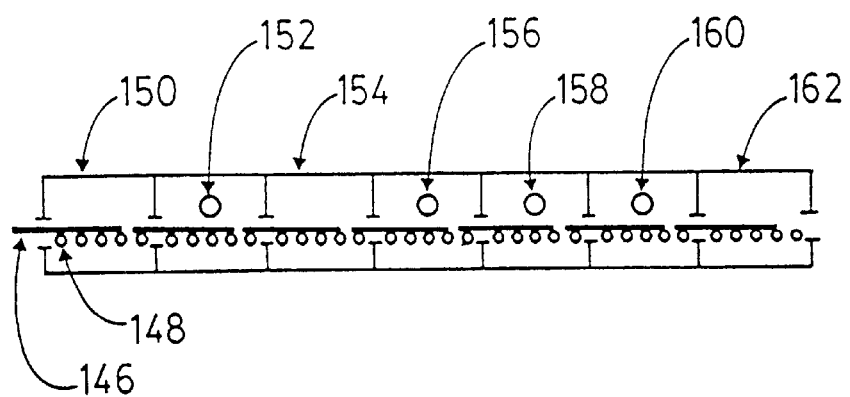
FIG._9.

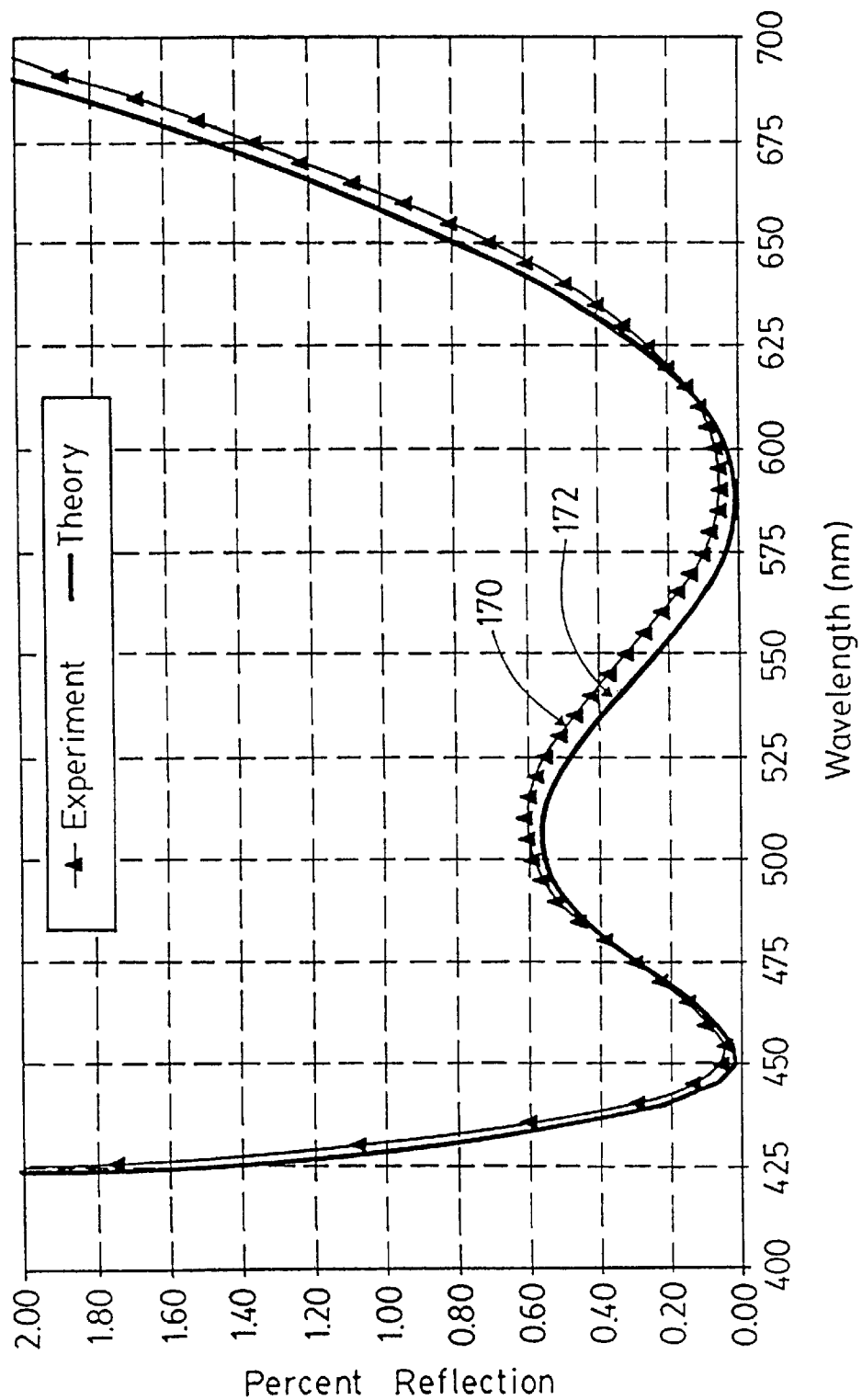
FIG._10.

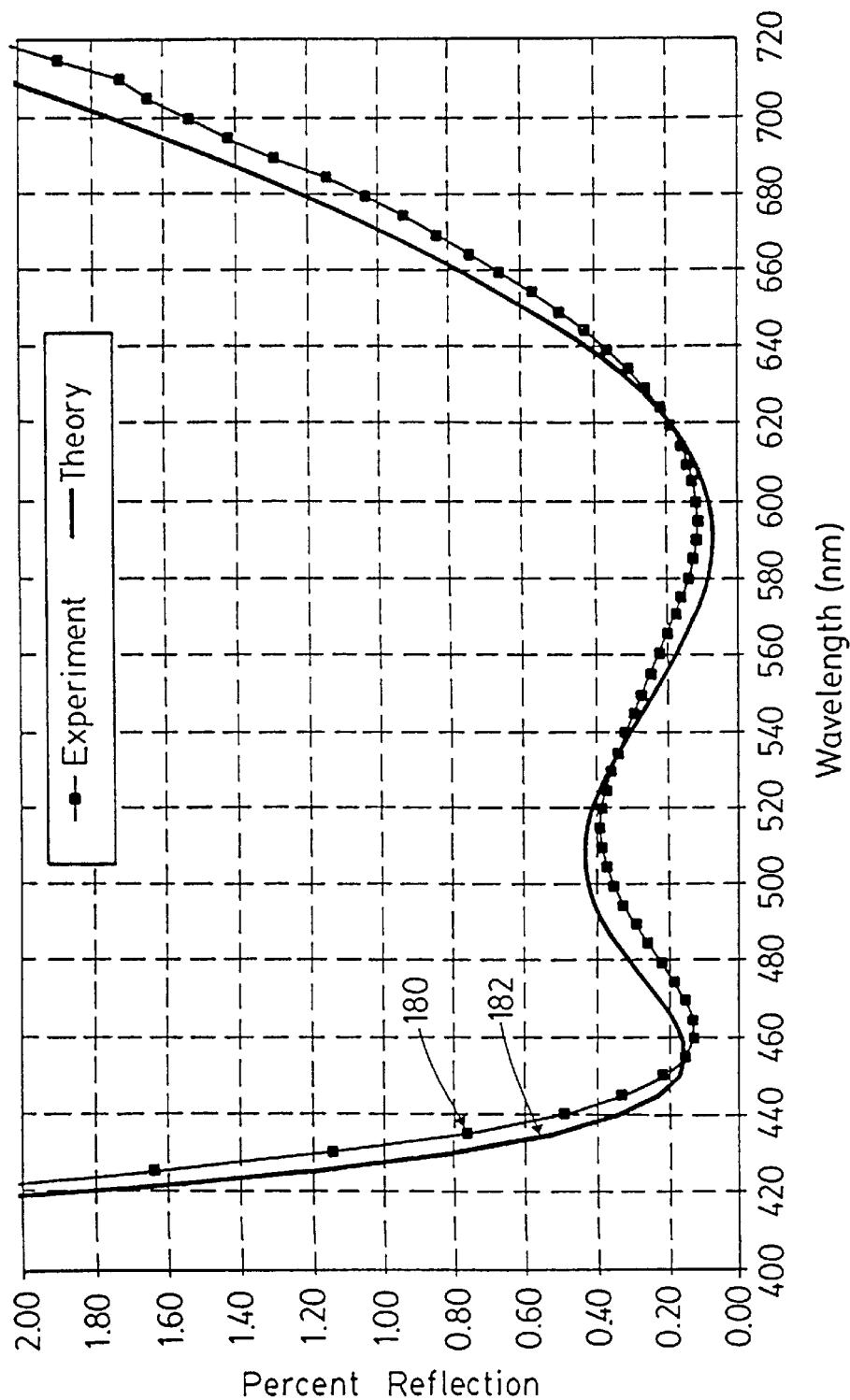
FIG._11.

BROAD-BAND ANTIREFLECTION COATING HAVING FOUR SPUTTERED LAYERS

BACKGROUND OF THE INVENTION

The present invention relates generally to multi-layer antireflection coatings for substrates, and more particularly to multilayer antireflection coatings for visible or near infrared light deposited on transparent or semitransparent substrates by sputtering.

The simplest antireflection (AR) coating is a single layer of a transparent material having a refractive index n which is less than that of the substrate on which it is deposited. According to J. Strong, "On a Method of Decreasing the Reflection from Nonmetallic Substrates," *J.Opt.Soc.Am.*, Vol. 26, January 1936, pp. 73–74, the optimum index n for the layer is equal to the square root of the index of the substrate. The optical thickness of the layer (n times the actual thickness d of the layer) is typically about one quarter of the central wavelength of the spectral region for which the reflectance is to be reduced. For visible light, this central wavelength is about 510 or 520 nm. Such a single-layer coating produces a minimum reflectance at the central wavelength. At all other nearby wavelengths, the reflectance is higher than the minimum value but lower than the reflectance of the uncoated substrate. Coating a glass substrate with a refractive index of 1.52 with a quarterwave layer of $MgF_2$ having an index of 1.38 reduces the reflectance of the glass from about 4.26% to about 1.26% at the central wavelength.

Multilayer AR coatings are typically made by depositing two or more layers of transparent dielectric materials on a substrate. One type of multilayer AR coating consists of layers with indices of refraction less than the substrate, with the layers arranged in order of decreasing index of refraction from the substrate outwards. See L. Young, "Antireflection Coatings on Glass," *Applied Optics* 4, 366–367 (1965) and U.S. Pat. No. 5,262,633. The more common multilayer AR coating includes one or more layers with indices of refraction higher than the index of refraction of the substrate. The simplest such multilayer AR coating consists of two layers. The first layer on the substrate is a high-index layer having an optical thickness less than a quarterwave at the central wavelength. This layer is followed by a low-index layer with an optical thickness greater than a quarterwave at the central wavelength. See U. S. Pat. Nos. 2,281,474 and 2,782,676. Such a coating can generally achieve a zero reflectance at the central wavelength. The disadvantage of this type of coating is that on each side of the central wavelength, the reflectance increases sharply. Thus, if the central wavelength lies within the visible spectrum, the reflectance values at some wavelengths in the visible spectrum are much higher than for the single-layer AR coating and in some cases higher than the uncoated substrate itself. Because of the V shape of the reflectance curve, this type of AR coating is often referred to as the V-Coat design.

A special case of the two-layer AR coating occurs if the high-index layer has a specific value of the index of refraction. Let $n_H$ denote the index of the high-index layer; $n_L$ the index of the low-index layer; and $n_S$ the index of the substrate. Then if $n_H^2 = n_S n_1^2$, the correct optical thicknesses of the high- and low-index layers to give zero reflectance at the central wavelength are both one quarter of the central wavelength. This design is sometimes referred to as the quarter-quarter (QQ) AR coating. See Musset et al., "Multilayer Anti-reflection Coatings," *Progress in Optics* 8, pp. 201–237 (1970). For example, if the glass substrate has a refractive index $n_S$ of 1.52 and the low-index outer layer has an index $n_L = 1.38$, then the correct index $n_H$ of the high-index layer for the QQ design is 1.70. One way of describing the action of the QQ design is to say that the high-index first layer raises the effective index of the substrate to a value such that the low-index second layer can provide a perfect AR coating at the central wavelength.

A simple broad-band AR coating consists of three layers. The first layer of the three-layer AR coating deposited on the glass substrate generally has a medium index of refraction, specifically higher than that of the substrate, and an optical thickness which is about one quarter of the central wavelength. The second layer has a high index of refraction, specifically higher than the first layer, and an optical thickness which is about one-half of the central wavelength. The third layer has a low refractive index, specifically lower than the first layer and generally lower than that of the substrate, and an optical thickness which is one quarter of the central wavelength. The three-layer design is described in Gaiser U.S. Pat. No. 2,478,385; Thelen U.S. Pat. No. 3,185,020; and Lockhart et al., "Three-Layered Reflection Reducing Coatings," *J.Opt.Soc.Am.* 37, pp. 689–694 (1947). This three-layer AR coating is often referred to as the quarter-half-quarter (QHQ) design. One way of describing the action of the QHQ design is to say that the medium-index first layer raises the effective index of the substrate, the high-index second layer provides the broad band performance, and the low-index third layer provides the anti-reflective property.

A disadvantage of the three-layer design is that the refractive indices of the three layers must have specific values in order to produce optimum performance. The selection and control of the refractive index of the first layer is particularly important. Deviation from specific refractive index values cannot be compensated for by varying the thicknesses of the layers.

Various modifications of the three-layer AR coating have been made to overcome this disadvantage. For example, one can form the second layer from a mixture of two materials to achieve the optimum refractive index as disclosed in U.S. Pat. No. 3,604,784. One can replace the second layer by two high-index layers, each having an optical thickness which is a quarter of the central wavelength as disclosed in U.S. Pat. No. 3,463,574. A fourth layer with refractive index lower than that of the substrate and an optical thickness of one-half of the central wavelength can be added between the medium-index layer and the substrate as disclosed in U.S. Pat. No. 3,781,090. A variety of AR coatings involving quarterwave- and halfwave-thick layers of various refractive indices are described in Musset, et al. (1970) and in Baumeister et al., "Application of Linear Programming to Antireflection Coating Design," *J.Opt.Soc.Am.* 67, pp. 1039–1045 (1977).

Another broad-band AR coating was disclosed by Millendorfer in U.S. Pat. No. 3,235,397. This AR coating consists of four or more alternating layers of two materials, having alternately a high and a low index of refraction. Using this approach, broad-band AR coating performance can be achieved using a range of high-index materials if the low-index material has an index of refraction similar to that of $MgF_2$—typically less than about 1.38. Similar AR coatings are discussed in U.S. Pat. Nos. 5,460,888 and 3,761,160.

The AR coatings discussed above are generally deposited by thermal evaporation. Specifically, $MgF_2$ can only be easily deposited by thermal evaporation. In addition, the times required for depositing layers by thermal evaporation are usually only a small fraction of the total production time. The production of coatings by thermal evaporation may include time to pump down the coating chamber, time to heat the substrates to process temperature, and time to cool the substrates after coating. The number of layers in an AR coating, the thicknesses, and the specific materials may not have a significant impact on the total production time or cost.

Magnetron sputtering is the process most often used for large area commercial coating applications. Magnetron sputtering involves sputtering from targets of selected materials in the close proximity of strong magnets using either a DC or an AC power supply. See U.S. Pat. Nos. 4,166,018 and 4,046,659. Most di-electric materials are sputtered reactively from a metal target using a reactive sputtering gas such as oxygen. Magnetron sputtering may be carried out in an in-line system to deposit thermal control coatings on architectural and automobile glazings and AR coatings on glass or cathode ray tubes (CRTs) used for computer monitors or television sets. In the in-line sputtering system, the articles to be coated pass through an entry lock, and then are passed through a vacuum chamber containing a series of sputtering sources, called cathodes or targets. The terms cathode and target are often used interchangably, but strictly speaking the target is the material being sputtered, while the cathode includes the target, the magnets and electrical connections necessary to enable the sputtering process. After coating, the articles pass through an exit lock.

For an in-line sputtering system, the heating and pump-down are done concurrently with the coating. Thus, some parts are being heated (if necessary) and some are being pumped down while others are being coated. Thus, the time taken to deposit the layers is an important factor. This time depends on thicknesses of the layers and on the deposition rates of the materials chosen for the coating. If the coating requires a thick layer of a material with a slow deposition rate, either the throughput of the system will be low because of the long time required to coat the layer or the in-line system will be large and therefore expensive because many sputtering cathodes will be necessary to deposit the layer rapidly enough to keep up with the desired throughput.

Many of the materials commonly used in thermal evaporation processes, particularly fluorides and sulfides, are not easily sputtered. In particular, the low-index material $MgF_2$ cannot practically be deposited in a sputtering system. Additionally, the high-index material $TiO_2$ has an extremely slow sputter-deposition rate. Thus, while $TiO_2$ is a desirable material for thermal evaporation, its use in large scale in-line sputtering systems comes with a penalty of low through-put or high coater cost.

A major improvement in the earlier AR coatings was introduced by Rock in U.S. Pat. No. 3,432,225. The Rock AR coating is made from two coating materials, one material having a high index of refraction, generally greater than 2, and the other having a low index of refraction, generally lower than that of the substrate. The Rock AR coating consists of four layers. The first layer adjacent to the substrate is of the high-index material and has an optical thickness which is approximately one-tenth of the central wavelength of the anti-reflection band. The second layer from the substrate is of the low-index material and has an optical thickness which is about one-tenth of the central wavelength. The third layer from the substrate is of the high-index material and has an optical thickness which is about one-half of the central wavelength and the outer layer is of the low-index material and has an optical thickness which is about one-quarter of the central wavelength. The advantage of the Rock AR coating is that materials with specific refractive index values are not required; the thicknesses of the layers can be adjusted to give a low reflectance value across the visible spectrum for a range of possible material indices.

The basis for the design of the Rock AR coating is described in the Rock patent in terms of a construction called the polar-coordinate phase diagram, more commonly called the circle diagram. For a description of the circle diagram, see Apfel, "Graphics in Optical Coating Design," *Applied Optics* 11, 1303–1321 (1972). An important feature of the Rock AR coating in terms of the circle diagram is that the third layer gives rise to a full circle which lies completely to the left of the circle segment of the final layer. One way of describing the working of the Rock AR coating is to say that the first two layers raise the effective index of the substrate, the halfwave-thick third layer provides the broad band performance, and the final layer provides the antireflective property. This description is similar to that of the three-layer AR, except that the first two layers of the Rock AR coating perform the function of the medium-index first layer of the three-layer AR.

For evaporated coatings, the Rock AR coating is an economical solution to the problem of a broad-band AR coating. It requires only two coating materials, which can be used to deposit AR coatings on substrates with a wide range of refractive indices. The thick high-index layer is not a problem because, as was stated above, for evaporated AR coatings the deposition time is usually a small fraction of the total time necessary to produce a coating. There are several high-index materials which are suitable for the high-index layer deposited by evaporation, such as $TiO_2$, $HfO_2$, $ZrO_2$, $Ta_2O_5$, and $Nb_2O_5$, and mixtures of these materials with each other or with other materials.

The Rock AR coating has become the basis for most visible AR coating designs. Depending on the index of the substrate and the index of the low-index material, there may be an optimum index for the halfwave layer to give the broadest low-reflection region. In a variation of the Rock AR coating, the halfwave third layer can be subdivided into two or more sublayers of various refractive indices to improve the width of the low-reflectance region. See Laird et al., "Durable Conductive Anti-reflection Coatings for Glass & Plastic Substrates," *Soc. Vacuum Coaters*, 39th Annual Technical Conference Proceedings, 361–365 (1996) and U.S. Pat. No. 4,128,303.

In the case of sputtered AR coatings, a preferred material from an optical point of view for the high-index third layer is $TiO_2$, because of its high index of refraction. However, $TiO_2$ has a slow deposition rate. The slow rate is only partially compensated for by running the $TiO_2$ at a much higher power. Thus, a significant time and number of sputter cathodes must be devoted to the sputtering of the thick third layer. A further problem arises in the sputtering of temperature-sensitive materials, such as plastic film which cannot take temperatures over about 60° C., or CRTs which cannot be exposed to temperatures above approximately 150° C. In this case, the high power of the $TiO_2$ sputter sources can easily overheat the substrates. To avoid overheating, the $TiO_2$ targets can be run at lower power, but only at the expense of a much slower coating process or one which requires many more $TiO_2$ targets.

Several solutions to the problem of coating the high-index third layer in a more economical manner have been proposed. For example, the use of $Nb_2O_5$ in place of $TiO_2$, as disclosed in U.S. Pat. Nos. 5,372,874 and 5,450,238, has the advantage that the deposition rate of $Nb_2O_5$ is about twice as fast as that of $TiO_2$. Thus, the use of $Nb_2O_5$ would decrease the time or number of cathodes required to deposit the high-index third layer by a factor of two. The disadvantage of using $Nb_2O_5$ is that the cost of a niobium sputter target is about five times that of a similar titanium target. Similarly, other high-rate materials could be used for the high-index layers. One alternative is to divide the high-index halfwave layer into two quarterwave layers, one of $TiO_2$ and the other of a high-rate material such as ZnO. See U.S. Pat. Nos. 5,105,310 and 5,270,858. While this provides an improvement in the overall cost of the AR coating, there is a drawback in terms of coating durability, since ZnO tends to be hydroscopic. In addition, one is still left with the quarterwave of $TiO_2$.

Up until the present, all attempts to produce an economical broad-band AR coating by magnetron sputtering have been based on the Rock AR coating, which specifically has a high-index third layer or its equivalent which is approximately a halfwave thick. It is the object of the present invention to provide a broad-band AR coating in which the optical thickness of the high-index third layer is less than one quarterwave.

It is a further object of the present invention to provide an AR coating which is significantly more economical to produce by in-line magnetron sputtering than AR coatings based on the Rock AR coating design.

SUMMARY OF THE INVENTION

The present invention is an AR coating that is advantageously formed by magnetron sputtering. In a preferred four-layer coating embodiment, the present invention uses a relatively thin high-index third layer, while using silicon dioxide as the material of the low-index layer. The high-index layer is preferably made of $TiO_2$ because of its high index. However, $TiO_2$ sputters relatively slowly. The optical thickness of the high-index third layer is kept less than a quarterwave for the central wavelength of the AR coating. A thin high-index third layer minimizes the sputtering time of the coating. The index of refraction for silicon dioxide is greater than the index for $MgF_2$ which can only be deposited by evaporation. The index of refraction of silicon dioxide is about 1.47 and the index of refraction of $MgF_2$ is about 1.38. Because of this difference in refractive indices of these materials, it is not obvious that a good AR coating can be made with a high-index third layer having an optical thickness less than a quarterwave while still using silicon dioxide as the low-index layer. In fact, the AR coating of the present invention has a relatively low total visible reflectance.

The AR coating of the present invention has a total visible reflectance much less than the about four percent total visible reflection of untreated glass. Although the AR coating of the present invention does not have as low a total visible reflectance as the Rock AR coating that uses a half-wave optical thickness for the high-index third layer, the AR coating of the present invention is much more economical for in-line magnetron sputtering. The thickness of the high-index third layer can be reduced by more than half. This allows for in-line sputtering systems with fewer sputtering cathodes to form the high-index third layer, and/or allows for an increase in the line speed. The reflectance levels achieved by the AR coating of the present invention are suitable for a wide range of applications, including computer displays.

In a preferred embodiment, the AR coating is comprised of a first layer adjacent to the substrate being a medium-index material having an index greater than 1.9, a second layer being silicon dioxide with less than twenty percent other materials, a third layer being a high-index layer with an index of a refraction greater than 2.1 where the optical thickness of the high-index third layer is less than a quarterwave at the central wavelength of the AR coating, and a fourth layer being silicon dioxide with less than twenty percent of other materials. The optical thicknesses of the first and second layers are preferably less than a quarterwave as well.

Another embodiment of the present invention uses a medium-index first layer having a different composition than the high-index third layer. It has been found that the total visible reflectance of the AR coating is not significantly changed by using a medium-index first layer rather than a high-index first layer. In the sputtering enviroment, medium-index materials can typically be sputtered at higher rates and are thus more economical than high-index materials. Additionally, an electrically-conductive material such as tin-doped indium oxide (indium-tin oxide, $Sn:In_2O_3$, ITO) or aluminum doped zinc oxide (Al:ZnO, AZO) can be used as the medium-index first layer. This is important for applications such as CRT coatings in which the coating needs to have a certain level of electrical conductivity.

In one embodiment, the first layer is a medium-index layer with an index of refraction greater than 1.9, the second layer is a low-index layer having an index less than the first layer, the third layer is a high-index layer having an index of refraction greater than 2.1 with an optical thickness less than a quarterwave at the center optical wavelength of the AR coating, the high-index third layer having a different composition than the medium-index first layer, and a low-index fourth layer which has a lower index of refraction than the first layer. In one embodiment of the four-layer coating, the first layer can be made of indium-tin oxide, the second layer of silicon dioxide, the third layer of titanium dioxide, and the fourth layer of silicon dioxide.

Another embodiment of the present invention uses an absorbing layer. For example, materials with a modest level of absorption such as nickel oxide ($NiO_x$), nickel chromium oxide ($NiCrO_x$), or nickel vanadium oxide ($NiVO_x$) can be substituted for some of the high-index third layer. This can cut down on the amount of the high-index material required, in addition to providing absorption. The absorbing layer can be positioned on either side of the high-index third layer.

BRIEF DESCRIPTION OF THE DRAWINGS

The accompanying drawings which are incorporated in and constitute a part of the specification, schematically illustrate, among other things, embodiments of the present invention, and together with the general description given above and the detailed description of the embodiments given below serve to explain the principles of the invention.

FIG. 1 is a diagram illustrating the four-layer system of the present invention.

FIG. 2 is a graph that illustrates reflectance as a function of wavelength for an embodiment of the present invention and compares it to the reflectance of a broad-band AR coating with a half-wave high-index layer.

FIG. 3 is a graph illustrating the optimum merit function for a two-material AR coating using $SiO_2$ as the low-index material as a function of the refractive index of the high-index material over the range from 1.7 to 2.7.

FIG. 4 is a graph of the optical thickness of the third layer for the optimized design whose merit function is plotted in FIG. 3.

FIG. 5 is a circle diagram for a prior art broad-band AR coating.

FIG. 6 is a circle diagram for the present invention at the central wavelength of the low-reflection band.

FIG. 7 is a graph showing a merit function versus the high-index third-layer optical thickness.

FIG. 8 is a graph showing a merit function versus the high-index third layer optical thickness for third-layer optical thickness less than a quarterwave.

FIG. 9 is a diagram illustrating an in-line sputtering system for the production of an electrically-conductive four-layer AR coating.

FIG. 10 is a graph that illustrates the measured reflectance as a function of wavelength for an AR coating made according to the embodiment of the present invention listed in Table 3.

FIG. 11 is a graph that illustrates the measured reflectance as a function of wavelength for an AR coating made according to the embodiment of the present invention listed in Table 7.

DETAILED DESCRIPTION OF THE INVENTION

As shown schematically in FIG. 1 the four-layer system 20 of the present invention includes layers 26, 28, 30 and 32. The system may be deposited on a surface 24 of a substrate 22, which may be transparent or may absorb light. In FIG. 1, the thicknesses of the layers 26, 28, 30, 32 are depicted schematically in the vertical direction and the indicated thicknesses are approximately proportional to a preferred embodiment of the present invention. The width of each layer in the horizontal direction is drawn proportional to the approximate index of refraction of said layer in this preferred embodiment. The thickness and back surface of the substrate 22 are not shown. The substrate 22 may be glass or plastic, and preferably has an index of refraction between about 1.45 and 1.65. Without a coating, such a substrate surface has a reflectance between about 3.4% and about 6%. The purpose of the coating is to reduce the maximum reflectance of the substrate to a value below some value, such as about 0.6%, over a spectral region in the vicinity of some central wavelength. This type of coating is commonly called an antireflection or AR coating, and specifically the present invention relates to broad-band AR coatings.

The low-reflectance band refers to that part of the spectral region over which the reflectance of the AR coating is less than some specified value, such as 0.6%. The specified value is usually a small fraction of the reflectance of the uncoated substrate; for example, small compared to the 4.26% reflectance of uncoated glass. The low-reflectance band could also refer to the spectral region used in the design process. Specifically, as part of the design process, the layer thicknesses may be optimized to give as low a reflectance as possible over a particular spectral region. The low-reflectance band is typically defined in terms of two extreme wavelengths, which are the upper and lower limits of the wavelength range. For a broad-band AR coating, the ratio of the upper wavelength limit to the lower wavelength limit is greater than about 1.4 or more. The term "low-reflectance band" is synonymous with "low-reflectance region" and "low-reflectance range."

The central wavelength of a spectral region is defined as the wavelength corresponding to the average wavenumber of the extremes of the spectral region. The wavenumber is the reciprocal of the wavelength. Thus, if $\lambda_1$ and $\lambda_2$ are the limits of the spectral region, the central wavelength $\lambda_0$ is given by $$\lambda_0 = \frac{2\lambda_1\lambda_2}{\lambda_1 + \lambda_2}$$

For example, for the visible spectrum defined as extending from 400 to 700 nm, the central wavelength is approximately 510 nm. For an AR coating optimized over the range 430 to 655 nm, $\lambda_0$ is approximately 520 nm. The central wavelength may also be referred to as the design wavelength.

The first layer 26 on the substrate surface 24 has a medium or high index of refraction, typically greater than about 1.9, and an optical thickness which is preferably less than one quarter of the central wavelength of the AR coating. The second layer 28 has a low index of refraction, typically less than about 1.5, and an optical thickness preferably less than one quarter of the central wavelength. The third layer 30 distinguishes the present invention from the Rock AR coating and other standard broad-band AR coatings. It has a high index of refraction, typically greater than about 2.1, and an optical thickness less than one quarter of the central wavelength. The optical thickness of the high-index third layer can be less than one-sixth, one-seventh, or even one-eighth of the central wavelength. The fourth layer 32 has a low index of refraction, typically the same as that of the second layer 28, and preferably has an optical thickness equal to or slightly greater than about one quarter of the central wavelength.

For an AR coating made by sputter deposition, the low-index fourth layer is preferably silicon dioxide with less than 20% other materials. Typically, the silicon target includes a small amount of a conductive material, such as five to fifteen percent aluminum or 0.5% boron to make the silicon target conductive and enable the material to be sputtered with DC or medium frequency AC sputtering. The use of $SiO_2$ as the low-index material poses some limitations for sputtered AR coatings which are not present for AR coatings deposited by evaporation using $MgF_2$ as the low-index material. It is the purpose of this patent to overcome these limitations.

A specific feature of the present invention is that the first and third layers can have different compositions. While the third layer is restricted to materials with high indices of refraction which typically have slow sputter deposition rates, the first layer can be made of a medium-index material with a much higher deposition rate. The use of the high-rate material for the first layer does not have a detrimental effect on the reflectance of the AR coating. The use of the high-rate material for the first layer is important for reducing the cost of the coating produced by in-line sputter deposition.

Additionally, the first layer can be formed of a conductive material such as indium-tin oxide. This is important for coatings which require some conductivity to reduce static charge, such as CRT coatings.

In one embodiment, the layers are as follows: the first layer 26 is assumed to have a medium index of refraction of 2.0. Such a material might be $SnO_2$ or ZnO, which has a high sputter-deposition rate, or ITO or AZO, which is transparent and electrically conductive. The low-index material for layers 28 and 32 has an index of 1.47. Such a material is preferably sputtered $SiO_2$ with a small amount of $Al_2O_3$. The high-index material for the third layer 30 has an index of 2.6, typical of sputtered $TiO_2$. The glass substrate 22 is assumed to have a refractive index of 1.52.

For the purposes of illustration, an AR coating is designed for use in the visible spectrum. The specification is that the coating have a minimum reflectance over the range 430 to 655 nm. The central wavelength is taken to be 520 nm. The merit function to be minimized is the root mean square value of the reflectance calculated at 15-nm intervals over the spectral region. The optical thickness of the high-index third layer is constrained to be below a quarterwave at 520 nm. The optimum design for these conditions using the materials with refractive indices as given in the previous paragraph is given in Table 1:

TABLE 1

Specific Embodiment of Present Invention

| Layer Number | Material | Refractive Index | Physical Thickness (nm) | Number of Quarterwaves@520 nm |
|---|---|---|---|---|
| substrate | glass | 1.52 | — | — |
| 1 | medium index | 2.0 | 46.0 | 0.708 |
| 2 | low index | 1.47 | 29.6 | 0.335 |
| 3 | high index | 2.6 | 23.2 | 0.464 |
| 4 | low index | 1.47 | 105.7 | 1.195 |

The reflectance of this AR coating is illustrated in FIG. 2 as the solid curve 62. The merit function calculated for this curve is 0.27% and the spectral region between the values of reflectance equal to 0.6% is 428 nm to 657 nm which satisfies the condition for a broad-band AR. The total optical thickness of the coating is 2.7 quarterwaves or 0.676 of a wavelength at 520 nm.

Note that the thickness of the third layer is quite different from the standard Rock design. In the standard broad-band AR coating design, the high-index third layer is typically more than four times thicker than the 23.2-nm thick third layer 30 of the present invention.

As can be seen in the curves of FIG. 2, the reflectance of the present invention curve 62 is not quite as low as the reflectance of a standard broad-band AR coating with a half-wave high-index third layer curve 64. Also, the low-reflection band of the standard broad-band AR coating is slightly wider than the low-reflectance band of the present invention. However, the reflectance of the present invention is significantly below the reflectance of the uncoated substrate, and is sufficient for a wide range of applications. For example, a common computer monitor consists of a cathode ray tube or CRT. The reflection of room light from the surface presents a distraction and the possibility of eye strain to the user. In the early days of the computer, the image on the screen was mostly black with white or colored writing. For such an application, the very low reflectance provided by the standard broad-band AR coating is an advantage. In more recent times, word-processing and spread-sheet programs display a white background with black or colored information. In this case, the requirement for extremely low reflectance is eased and the reflectance level provided by the present invention is more than adequate to improve the performance of the monitor. Because of the reduction in thickness of the high-index third layer, the cost of the AR coating produced according to the present invention is significantly lower than the cost of the standard four-layer AR coating. This cost savings outweighs the slight benefit of lower performance provided by the standard four-layer AR coating.

Now consider the case for coatings produced by magnetron sputtering. In this case, $MgF_2$ cannot be used as the low-index material. Instead $SiO_2$ with a refractive index of 1.47 is used as the low-index material. One skilled in the art of AR coating designs would expect that an AR coating made with $SiO_2$ would not be as good as one made with $MgF_2$ because of the higher refractive index of the $SiO_2$.

Curve 44 of FIG. 3 illustrates the optimum merit function for a two-material AR coating using $SiO_2$ as the low-index material as a function of the refractive index of the high-index material over the range from 1.7 to 2.7. The merit function is below 0.3% for values of the high refractive index greater than about 2.1, but for lower values, the merit function increases rapidly. While the performance of the AR coating with $SiO_2$ is not quite as good as the performance of the coating with $MgF_2$, it is sufficiently good for a wide range of applications. However, the range of high-index materials is severely restricted in terms of sputtered coatings. In particular, the common high-index sputtered materials with indices above 2.1 are $TiO_2$ with an index in the range 2.4 to 2.6, $Nb_2O_5$ with an index of about 2.27 and $Ta_2O_5$ with an index of about 2.15. $TiO_2$ has the slowest sputter rate of the commonly used sputter materials and $Nb_2O_5$ and $Ta_2O_5$ have about twice the sputter rate of $TiO_2$. Specifically, materials like $SnO_2$ and ZnO which have sputter deposition rates six to 12 times faster than $TiO_2$ have refractive indices in the range 1.9 to 2.05, where the merit function is not as low.

Every point in FIG. 3 represents a four-layer AR coating. FIG. 4 is a graph of the optical thickness of the third layer in quarterwaves for the optimized design whose merit function is plotted in FIG. 3.

For example, if the index of refraction of the high-index layer is 2.6, the optical thickness of the third layer is about 0.47 quarterwaves, which is essentially the same value as given in Table 1. The optical thickness of the third layer increases as the refractive index decreases, leveling off at a value of about 1.17 quarterwaves for indices lower than 2.12. In the case of sputtered coatings, the added thickness of the high-index layer with lower index comes at a penalty of increased coating cost. To reduce the coating cost, one would like to restrict the optical thickness of the high-index layer to a value less than a quarterwave. This restriction further limits the range of high-index materials available to those with refractive indices above about 2.2; namely $TiO_2$ and $Nb_2O_5$.

The limitation of the slow sputter rate of the high-index material can be overcome to a significant degree by the present invention. Further optimization studies along the line of those leading to FIGS. 3 and 4 reveal that only the third layer of the coating needs to have the high index in order to achieve the low merit functions illustrated in FIG. 3. The merit function is essentially unchanged if the first layer has a refractive index in the range from 1.9 to 2.7. Thus, a high-rate material such as $SnO_2$ or ZnO can be used for the first layer, reducing the sputtering time and thus the cost of the sputtered coating. For example, the design given in Table 1 has a first layer with index 2 and a third layer with index 2.6. The merit function and the thickness of the third layer are almost exactly the same as given in FIGS. 5 and 6 for the index of 2.6. Thus the present invention offers a double savings in sputtering time over the prior art.

In order to more fully understand the difference between the present invention and a standard broad-band AR coating with half-wave high-index layer, consider the circle diagrams shown in FIGS. 5 and 6. FIG. 5 is the circle diagram for a standard broad-band AR coating and is adapted from the circle diagram presented in the Rock patent, U.S. Pat. No. 3,432,225. The horizontal and vertical axes represent the real and imaginary parts of the amplitude reflectance. The circle diagram applies to a single wavelength of light, which is assumed to be the central wavelength. The curve starts at the amplitude reflectance of the substrate 70, which for glass with n=1.52 is −0.2063, which lies on the negative real axis 81. As the first layer is added to the substrate, the amplitude reflectance proceeds along the arc 72 to the point 74. Next, the low-index second layer is added, and the amplitude reflectance follows the arc 76 to the point 78. Because this point 78 is close to the negative real axis 81, the amplitude reflectance corresponds to the amplitude reflectance of an effective substrate, and because the point 78 lies to the left of the point 70, the effective substrate has a higher refractive index than the actual glass substrate. The amplitude reflectance of the effective substrate is almost exactly the right value so that if one were to add a quarterwave of the low-index material, one would have a reflectance of zero. This fact illustrates graphically the statement made earlier that the first two layers of the standard broad-band AR coating raise the effective index of the substrate. When the high-index third layer is added, the amplitude reflectance traces a circle 80 in a clockwise direction which lies substantially to the left of the segments corresponding to the first two layers. The curve for the third layer is a complete circle because the layer has an optical thickness which is a halfwave. As the low-index final layer is added, the amplitude reflectance proceeds around the semicircle 84 to the final point 86 at the origin, corresponding to a value of the reflectance equal to zero.

Note that to determine the reflectance corresponding to any point on the circle diagram (curves 72, 76, 80 and 84), one measures the distance from the curve to the origin and squares the value. Thus, for example, the reflectance of the substrate is $(-0.2063)^2$ or 0.0426, corresponding to 4.26%. The final amplitude reflectance at point 86 is at the origin, corresponding to a reflectance of 0%. The curve 84 illustrates the statement that the final layer provides the antireflective property.

The distinctive feature of the standard broad-band AR coating as discovered and stated by Rock is the halfwave thick third layer which gives rise to the circle on the left side of the diagram in FIG. 5. Other designs borrowed from the Rock AR coating design have one or more layers which trace out approximately this circle. For example, if the third layer were divided into two quarterwave layers with slightly different refractive indices, the circle diagram would have two semicircular segments of slightly differing radii.

Consider the seven-layer AR coatings disclosed in U.S. Pat. No. 4,313,647. The seven-layer coatings are specifically for low-index substrates. The first three layers of these coatings act as the two index-matching layers of the Rock AR coating design. The next three layers act as the broadening layer, and the final layer is the antireflecting layer.

Compare the above behavior of the circle diagram for the standard broad-band AR coating to the behavior of the preferred embodiment of the present invention given in Table 1, which is illustrated in FIG. 6. The amplitude reflectance of the substrate is at the point 90. As the medium-index first layer is added, the amplitude reflectance proceeds along arc 92 to the point 94. Next, the low-index second layer is added and the amplitude reflectance follows the arc 96. Note that the endpoint 98 of this arc does not lie close to the negative real axis 101. The arc 100, corresponding to the high-index third layer, is much less than a circle, indicating that the layer thickness must be less than a halfwave. Because the endpoint 102 of this arc is below the negative real axis 101, the arc 104 corresponding to the last layer is more than a semicircle, indicating that the low-index final layer is slightly more than a quarterwave thick. The endpoint 106 is near to the origin 108, but not quite as close as the endpoint 86 of the circle diagram of the standard broad-band AR coating is to the origin. The distance between the points 106 and 108 is 0.059, corresponding to a reflectance of 0.35%. This corresponds to the reflectance at 520 nm, which is point 66 in FIG. 2.

The structure of the circle diagram for the present invention shown in FIG. 6 is clearly distinct from the circle diagram for the standard broad-band AR coating shown in FIG. 5. Most significantly, in FIG. 6 there is no circle extending to the left of the other arcs, so there is no obvious broadening layer. In addition, the amplitude reflectance 98 after the first two layers does not lie close to the negative real axis, so the first two layers do not simulate a substrate of a higher index than the actual substrate. Thus, the present invention cannot be described by the statement that the first two layers raise the effective index of the substrate and the third layer broadens the low-reflectance region. Apparently, in the present invention, the first three layers act together to perform the index-matching function and the broadening function of the AR coating.

In view of the significant advantage offered by the present invention in terms of reducing the cost of a broad-band AR coating produced by in-line magnetron sputtering, which will be demonstrated below, one might ask why the design of the present invention has not been recognized before. One reason is the success of the Rock AR coating design and the nature of the explanation of how it works in terms of the circle diagram. The focus of consequent improvements on the Rock AR coating design have been in terms of the basic elements of the design—namely, the index-matching layers, the broadening layer and the antireflecting layer. Thus, the index-matching layer might be made as a single layer but of composite materials, or the halfwave broadening layer might be broken into two or three pieces which perform the broadening function in some improved way. However, since the Rock patent, the basic teachings of AR coating design theory have emphasized the need for this halfwave broadening layer.

Even when the preferred materials of the present invention are used for the four layers, it would not be obvious to find the preferred layer thicknesses of the present invention. FIGS. 7 and 8 have been drawn assuming a four-layer design using the preferred materials of the present invention with a first layer of ITO, a second layer of $SiO_2$, a third layer of $TiO_2$, and a fourth layer of $SiO_2$. These graphs show the number of quarterwaves of optical thickness of the high-index third layer along the horizontal axis, and a merit function along the vertical axis. The merit function is the root mean square value of the reflectance calculated at 15 nm intervals over the spectral region 430–655 nm. The curves in this case are determined by setting the thickness for the high-index third layer and then modifying the thicknesses of the other three layers so as to minimize the merit function. As seen in FIG. 7, the merit function has a global minimum at point 136 where the third layer has an optical thickness of about two quarterwaves. This point corresponds to the standard broad-band AR coating based on the Rock design. As the thickness of the third layer is changed from this value, the merit function increases away from the desired minimum value. At the point 130, the design with the lowest merit function becomes a three-layer design and as the thickness of the third layer is decreased further, the merit function of the optimum three-layer design continues along the curve 128 shown in phantom, reaching a maximum value at a thickness of one quarterwave. If one were to continue the optimization process with the three-layer design for thicknesses of the high-index layer less than a quarterwave, one would find another minimum 118 at an optical thickness of about 0.37 quarterwaves. This minimum 118 corresponds to a three-layer broad-band AR coating with a relatively thick first layer.

Only when the optical thickness of the high-index third layer is restricted to the range below one quarterwave and a four-layer coating with a design close to the one given in Table 1 is used as a starting point is the present design found. The optimum merit function versus the optical thickness of the third layer is shown in FIG. 8 over the range from zero to a quarterwave. The minimum value at the point 120 corresponds to the design of the present invention. This point corresponds to a local minimum of the merit function because its value is higher than the value at the global minimum shown in FIG. 7.

addition, the material for the medium-index layer could also be any one of the high-index materials mentioned here.

Using any of the material combinations mentioned above, one could apply various optimization criteria to arrive at designs which satisfy the conditions of the present invention. For example, one could use a broader or narrower spectral region over which to optimize the reflectance. One could use a merit function other than the root-mean square reflectance. One could require that the color of the light reflected from the coating have a particular value, according to the CIE color system for example.

An alternate design follows the requirement that the reflectance of the AR coating be a minimum as perceived by the eye. The reflectance perceived by the eye is called the visual reflectance. To achieve this minimum, one would weight the reflectance at each wavelength in the visible spectrum according to the level of the eye's response to that wavelength, and then minimize the weighted average. Applying the eye weighting function to the reflectance of the embodiment of the present invention given in Table 1, the visual reflectance is 0.18%. However, if one requires a minimum eye-weighted average reflectance, the optimum design is given in Table 2. The visual reflectance of this coating is 0.09%. The design in Table 2 is a preferred embodiment of the present invention and is typical of the various designs that fall within the scope of the present invention.

TABLE 2

Embodiment of Present Design with Minimum Visual Reflectance

| Layer Number | Material | Refractive Index | Physical Thickness (nm) | Number of Quarterwaves@520 nm |
|---|---|---|---|---|
| substrate | glass | 1.52 | — | — |
| 1 | medium index | 2.0 | 44.7 | 0.688 |
| 2 | low index | 1.47 | 29.6 | 0.335 |
| 3 | high index | 2.6 | 26.0 | 0.520 |
| 4 | low index | 1.47 | 107.0 | 1.210 |

The above example illustrates that, when one is optimizing a four-layer AR coating, it is possible for one of the layers in the optimum coating to have zero thickness and thus for the optimum coating to have fewer than four layers. However, when optimizing a three-layer coating, it is not obvious that one should look for a four-layer coating or that an optimum four-layer coating even exits.

Note that if a computer program were used to performed a random search of four-layer designs with the layers having the indices as specified above, searching for the design with the minimum merit function, the standard design corresponding to the point 136 would be found. This design represents the global minimum. The design of the present invention, corresponding to the point 120 of FIG. 6, would not be found because this represents a local minimum with a higher merit function that the one at 136.

Many alternate materials can be used with the present invention. As mentioned previously, $TiO_2$ and $Nb_2O_5$ are the materials of choice for the high-index third layer produced in an in-line sputtering system. Other materials with high refractive indices are $CeO_2$ and $Bi_2O_3$, which could be used for this layer.

There are a variety of medium-index materials that could be used for the first layer, including $HfO_2$, $ZrO_2$, $Sc_2O_3$, $Si_3N_4$. and AlN with indices in the range of 1.9 to 2.1, in addition to $SnO_2$, ZnO, ITO and AZO mentioned already. In In order to demonstrate the advantages of the present invention in terms of the cost savings and increased throughput of an in-line sputtering system, an example related to production designs is used. In this embodiment, the medium-index first layer of the coating is taken to be ITO. Because ITO is electrically conductive as well as being transparent with a refractive index of 2.0, the resulting coating is conductive. Such a coating might be used for the surface of a CRT screen to eliminate static charge build-up while reducing the reflectance of the surface. The low-index material is taken to be Sio2 and the high-index layer is made from $TiO_2$. For this embodiment, the visual reflectance as detected by the eye is minimized while maintaining a reflected color of x=0.24 and y=0.24 in the CIE color system using a 2° observer and illuminant D-65. The resulting coating designs for the present invention and for the standard broad-band AR coating are listed in Table 3.

The first column of Table 3 gives the layer number starting with the layer adjacent to the substrate and the second column gives the corresponding material for each layer. The third column gives the refractive index at 520 nm, although for the optimization calculation used to determine the layer thicknesses, the full dispersion curves were used. The fourth column gives the layer thicknesses for a preferred embodiment of the present invention and the fifth column gives the layer thicknesses for an embodiment of the standard broad-band AR coating determined by the optimization procedure given in the previous paragraph. The last column of Table 3 gives the deposition rate for the material used for each layer. The units for the deposition rate are nm-m/min, which indicate that the rate is defined as the thickness of the coating in nanometers which would be deposited on a substrate moving past the sputter cathode at a line speed of one meter per minute. The deposition rates for the materials given in Table 3 are typical of those that might be achieved in the production of an AR coating on a CRT surface.

TABLE 3

AR Coating Designs for Production Calculation

| Layer Number | Material | Refractive Index | Physical Thickness (nm) Present Invention | Standard BroadBand AR | Maximum Deposition Rate (nm-m/min) |
|---|---|---|---|---|---|
| substrate | glass | 1.52 | — | — | — |
| 1 | ITO | 2.0 | 36 | 34 | 15 |
| 2 | $SiO_2$ | 1.47 | 37 | 24 | 9 |
| 3 | $TiO_2$ | 2.6 | 17 | 100 | 7 |
| 4 | $SiO_2$ | 1.47 | 110 | 88 | 9 |

Tables 4 and 5 compare the throughput of coaters with various cathode configurations for the two AR designs given in Table 3. The throughput numbers are calculated based on the line speed as given, assuming no gaps between sheets of glass, a 1.5 meter wide sheet of glass and 7000 operating hours per year.

The minimum in-line system would have four cathodes, one of each material as illustrated in the schematic illustration of the side view of a coating system depicted in FIG. 9. Sheets of glass 146 enter the entry buffer 150 and are transported from left to right on rollers 148. The entry lock forming the transition between air and the vacuum chamber is not shown. The sputter cathodes are shown as circles, representing the end view of rotating cylindrical cathodes. Planar cathodes could also be used for the medium- and high-index materials. Sputter cathodes are described in U.S. Pat. Nos. 4,356,073 and 4,422,916, incorporated herein by reference. The first cathode 152 is a ceramic ITO cathode. This is followed by an isolation zone 154 because ITO is sputtered in a different gas mixture from the other materials. The second cathode 156 in FIG. 9 is Si for the $SiO_2$ second layer of the AR coating. In practice, the Si includes about five to fifteen percent Al to make the cathode conductive. The third cathode in FIG. 9 is Ti, denoted by 158, and the Si cathode for the last layer is denoted by 160. The Si and Ti cathodes may be sputtered in pure oxygen to give $SiO_2$ and $TiO_2$ films as deposited on the substrates. After the final Si cathode 160, the glass passes into the exit buffer 162. The exit lock forming the transition between vacuum and air is not shown.

To determine the maximum thickness of the layer deposited by each cathode from the deposition rates given in Table 3, use the formula $$\text{Maximum Thickness} = \frac{\text{Deposition Rate}}{\text{LineSpeed}}$$

The maximum line speed is 0.07 m/min for the standard broad-band AR coating design, limited by the deposition rate of the $TiO_2$. At this line speed, the maximum thickness calculated for the $TiO_2$ layer is 100 nm, corresponding to the thickness given in Table 3. The first line of Table 4 shows the percentage of maximum power for each of the cathodes for a system with four cathodes running at 0.07 m/min, producing 44,000 $m^2$/year of the standard broad-band four-layer AR coating. The percentages have been calculated by comparing the maximum thickness which can be deposited by each cathode running at 0.07 m/min calculated according to the above formula to the layer thickness of the design given in Table 3. From Table 4, one can see that for the line speed of 0.07 m/min, only the Ti cathode is running at 100%.

TABLE 4

Throughput Levels for the Standard Broad-Band AR

| Line Speed (m/min) | Throughput (1000 $m^2$/yr) | Total # of Cathodes | Number of Cathodes and Percent Utilization | | | |
|---|---|---|---|---|---|---|
| | | | ITO | Si($SiO_2$) | Ti($TiO_2$) | Si($SiO_2$) |
| 0.07 | 44 | 4 | 1 @ 16% | 1 @ 19% | 1 @ 100% | 1 @ 68% |
| 0.14 | 88 | 6 | 1 @ 32% | 1 @ 37% | 2 @ 100% | 2 @ 68% |
| 0.41 | 258 | 13 | 1 @ 93% | 2 @ 55% | 6 @ 97% | 4 @ 100% |

TABLE 5

Throughput Levels for the Present Invention

| Line Speed (m/min) | Throughput (1000 m²/yr) | Total # of Cathodes | Number of Cathodes and Percent Utilization | | | |
|---|---|---|---|---|---|---|
| | | | ITO | Si(SiO$_2$) | Ti(TiO$_2$) | Si(SiO$_2$) |
| 0.08 | 50  | 4 | 1 @ 19% | 1 @ 33% | 1 @ 19% | 1 @ 98% |
| 0.24 | 151 | 6 | 1 @ 58% | 1 @ 99% | 1 @ 58% | 3 @ 98% |
| 0.41 | 258 | 9 | 1 @ 98% | 2 @ 84% | 1 @ 99% | 5 @ 100% |

The maximum line speed is approximately 0.08 m/min for the present invention, limited by the SiO$_2$ fourth layer. The first line of Table 5 shows the percentage of maximum power for each of the cathodes for a system with four cathodes running at 0.08 m/min, producing 50,000 m²/year of the four-layer broad-band AR coating based on the present invention. In terms of throughput, there is a slight advantage of the present invention to the standard broad-band AR in this minimal configuration.

For the four-cathode coater, there is a significant advantage of the present invention for coating plastic substrates, which are heat sensitive. Plastic substrates are damaged by the heat generated by a Ti cathode running at full power. Thus, in order to coat the standard broad-band AR coating on plastic, the Ti cathode would have to be run at a small fraction of its maximum power, with a corresponding reduction in line speed and throughput. Alternatively, the high-index layer would have to be replaced by a material with a high sputter rate as disclosed in U.S. Pat. No. 5,579,162. The present invention has the advantage of using less material for the high-index third layer, thus allowing the cathode to be run at a significantly reduced power.

A significant throughput advantage becomes apparent with the addition of two more cathodes to the system. In the case of the standard broad-band AR coating, one of the additional cathodes is Ti to increase the throughput of the TiO$_2$ layer and the other is a Si cathode to increase the throughput of the final SiO$_2$ layer. The number of cathodes and percent utilization is shown in the second row of Table 4. The effect is to double the line speed to 0.14 m/min and the throughput of the system to 88,000 m²/yr. The TiO$_2$ layer is still the limiting factor. In the case of the present invention, the two additional cathodes can be used to increase the throughput of the final SiO$_2$ layer. In this case, the line speed can be increased to 0.24 m/min and total throughput of the system can be tripled to give 151,000 m²/yr as illustrated in the second row of Table 5. Because the TiO$_2$ layer is much thinner in the present design than in the standard broad-band AR coating, the single Ti cathode is still not running at 100% at this line speed for the AR coating produced according to the present invention.

As a further example of the advantage of the present invention, suppose that a total output of more than 250,000 m²/yr is required. This throughput can be achieved with a line speed of 0.41 m/min. The third rows of Tables 4 and 5 compare the number of cathodes that would be required for each design to achieve this throughput. In particular, six Ti cathodes running at 97% are required to produce the thick TiO$_2$ layer of the standard broad-band AR, while one Ti cathode is sufficient for the present invention. When all of the layers are taken into consideration, the standard broad-band AR coating requires thirteen cathodes to produce 258,000 m²/yr, compared to nine cathodes required to produce the same volume using the present invention. This reduction in number of cathodes represents a savings of several million dollars in the initial cost of the coater and thus several dollars per square meter in cost of depreciation.

The present invention is an improvement in terms of cost reduction over other designs based on the Rock AR coating design. For example, U.S. Pat. No. 5,450,238 suggests replacing TiO$_2$ with Nb$_2$O$_5$ in the design. The Nb$_2$O$_5$ has approximately twice the deposition rate of TiO$_2$. Thus, six Ti cathodes would be cut to three Nb cathodes. The standard broad-band AR coating with Nb would still have more cathodes than the coater for the present invention, because of the thickness of the halfwave high-index third layer in the standard Rock design. Because the cost of Nb is much higher than the cost of Ti, the cost per square meter would be significantly higher.

As another example, U.S. Pat. No. 5,270,858 suggests replacing half of the TiO$_2$ layer with ZnO, because of the much higher deposition rate of the latter material. In a coater with a throughput of 258,000 m²/year, one is still left with three Ti cathodes and one Zn cathode, or a total of eleven cathodes, compared to the nine for the coater based on the present invention.

The throughput of the above coaters could be further increased by using dual-cylindrical magnetrons (such as dual C-MAG® cathodes available from BOC Coating Technology located in Fairfield, Calif.) or twin planar magnetrons, which allow one to put two sputter targets in each cathode position; AC power supplies which allow the Si cathodes to run at a higher power; and enhanced rate processes which can increase the deposition rates by a factor of from two to five or more. In every case, the AR coating based on the present invention will have the advantage of a thinner TiO$_2$ layer and thus an increased throughput or a reduced coater cost.

A test coating was made using the stack design of Table 3. The materials for the layers were ITO, SiO$_2$, TiO$_2$ and SiO$_2$. The coating was produced in an in-line dc-magnetron sputter system containing C-MAG® 3000 cathodes of ITO, Si and Ti. The ITO target was a ceramic target 90% In$_2$O$_3$ and 10% SnO$_2$. The Ti target was 100% Ti metal. The Si target was 93% Si and 7% Al. The ITO was sputtered in a mixture of Ar with O$_2$. The Si and Ti targets were sputtered in pure O$_2$ to give SiO$_2$ and TiO$_2$ films. The details of the coating process are given in Table 6.

TABLE 6

First Test Coating Production Recipe.

| Material | Current (amps) | Power KW | Cathode Voltage | Anode Voltage | Gas Flow oxygen (sccm) | argon | Linespeed × number of passes cm/min |
|---|---|---|---|---|---|---|---|
| ITO | 9.53 | 4.0 | −423 | 0 | 32 | 604 | 72 × 1 |
| $SiO_2$ | 39.4 | 15 | −275 | 104 | 592 | — | 99 × 3 |
| $TiO_2$ | 73.9 | 40 | −460 | 69 | 860 | — | 81 × 4 |
| $SiO_2$ | 39.8 | 15 | −277 | 101 | 509 | — | 81 × 9 |

The measured reflectance curve 170 of the coated sample is compared to the calculated reflectance curve 172 in FIG. 10. The agreement between theory and practice is good.

For a second test coating of the present invention, the design listed in Table 7 was used. For this embodiment of the present invention, $SnO_2$ was used as the medium-index material. For the high-index material, $Nb_2O_5$ was used. In this embodiment, high-rate materials have been used for both the medium- and high-index materials so that further increases in throughput over those discussed above are possible with this design. The low-index material was $SiO_2$ with a small percentage of $Al_2O_3$. The low-index layer was formed by sputtering from a target comprised of Si with 7% Al. The refractive index of each material at 510 nm is listed in the third column of Table 7, although the full dispersion curves were used in the optimization process. The layer thicknesses were obtained by optimizing for minimum visual reflectance while maintaining CIE color coordinates x=0.244 and y=0.240. The calculated visual reflectance of the design is 0.25%.

TABLE 7

Second Reduction to Practice of the Present Invention.

| Layer Number | Material | Refractive Index@510 nm | Physical Thickness (nm) | Number of Quarterwaves@510 nm |
|---|---|---|---|---|
| substrate | glass | 1.52 | — | — |
| 1 | $SnO_2$ | 1.91 | 50 | 0.75 |
| 2 | $SiO_2$ | 1.47 | 21 | 0.25 |
| 3 | $Nb_2O_5$ | 2.27 | 35 | 0.63 |
| 4 | $SiO_2$ | 1.47 | 100 | 1.15 |

An AR coating was made using the design listed in Table 7. Table 8 gives the recipe.

TABLE 8

Second Test coating Production Recipe.

| Material | Current (amps) | Power KW | Cathode Voltage | Anode Voltage | Gas Flow oxygen (sccm) | argon | Linespeed × number of passes cm/min |
|---|---|---|---|---|---|---|---|
| $SnO_2$ | 16.8 | 6 | −358 | 0 | 567 | — | 59 × 2 |
| $SiO_2$ | 42.2 | 15 | −269 | 95 | 620 | — | 89 × 2 |
| $Nb_2O_5$ | 61.8 | 40 | −568 | 79 | 713 | — | 61 × 2 |
| $SiO_2$ | 42 | 15 | −270 | 94 | 650 | — | 57.5 × 6 |

The AR coating was produced in an in-line dc-magnetron sputter system containing C-MAG® 3000 cathodes of Sn, Si and Nb sputtered in $O_2$. The Sn target was a cast metal target. The Nb target was an extruded metal target. The measured reflectance curve 180 of the coated sample is compared to the calculated reflectance curve 182 in FIG. 11. The coating has a measured visual reflectance of 0.26%, with x=0.246 and y=0.225. The agreement between theory and practice is good. The width of the coating calculated according to the ratio of the wavelengths where the reflectance is 0.6% is about 1.49, so the coating meets the criterion for a broad-band AR coating.

Alternately, the stack of the present invention can include an absorbing material. For example, materials with a modest level of absorption can be substituted for some of the high-index third layer. An example of a material with such a modest level of absorption is nickel oxide ($NiO_x$). The use of nickel oxide as an absorbing layer is described in H. Schroeder, "Special Oxide Layers," *Physics of Thin Films* 5, 105 (1969). Other absorbing materials suitable for this application include $NiVO_x$, $NiCrO_x$, and $Ni:Si_3N_4$. $NiVO_x$ is the preferred choice because the addition of the vanadium to the nickel provides a non-magnetic target and $NiVO_x$ has a more neutral absorption across the visible spectrum. If a 20% absorption coating is desired, one stack design comprises a first layer of indium-tin oxide being 29.5 nm thick, a second layer of silicon dioxide being 48.5 nm thick, an absorbing layer of nickel vanadium oxide being 14.5 nm thick, a high-index titanium dioxide layer being 11.5 nm thick, and a top low-index silicon dioxide layer being 103.5 nm thick. Note that the thickness of the titanium dioxide layer is lower than even the embodiment of the present invention shown in Table 3. This provides a production cost advantage for this absorbing coating.

Although the above discussion relates specifically to AR coatings for the visible light spectrum, one skilled in the art will recognize that there are benefits to the design of broad-band coatings for other wavelength ranges close to the visible spectrum. In these spectral ranges, the same or similar optical materials are available and the indices of refraction are similar. For example, high-energy lasers operate at a wavelength of 1064 nm in the near infrared spectral region. Although the laser operates at a single well-defined wavelength, a V-Coat AR coating design is usually not used in production. Rather, a design based on the standard broad-band AR coating design is used. See Carniglia, "Oxide Coatings for One Micrometer Laser Fusion Systems," *Thin Solid Films* 77, 225–238 (1981). The broad low reflectance region is necessary to provide production tolerance so that the low reflectance can be achieved over a large coated part. The high energy of the laser pulse can cause damage to the AR coating, and the damage is usually associated with the high-index material. The present invention can be used to design a broad-band AR coating suitable for use with high-energy lasers having a much reduced thickness of the high-index material and possibly an increased laser damage threshold.

The present invention has been described in terms of a number of embodiments. The invention however is not limited to the embodiments depicted and described, and other embodiments will be evident to those skilled in the art. The scope of the invention is defined by the appended claims.

What is claimed is:

1. An antireflection coating for a transparent or semitransparent substrate consisting essentially of four optical interference layers, the coating comprising:
    a first layer adjacent to the substrate having a refractive index greater than about 1.9;
    a second layer comprising silicon dioxide or silicon dioxide doped with less than 20% of another material;
    a third layer having a refractive index greater than about 2.1 and an optical thickness less than $\lambda_0/4$, where $\lambda_0$ is a central wavelength corresponding to a spectral region bounded by or in the visible spectrum; and
    a fourth layer comprising silicon dioxide or silicon dioxide doped with less than 20% of another material.

2. The antireflection coating of claim 1, wherein the coating is deposited by magnetron sputtering.

3. The antireflection coating of claim 1, wherein the third layer comprises a material selected from $TiO_2$, $Ta_2O_5$, $Nb_2O_5$, a first mixture of any two of these materials, and a second mixture of one of these materials with another material, each of the first mixture and the second mixture having an index of refraction greater than 2.1.

4. The antireflection coating of claim 3, wherein the third layer comprises $TiO_2$.

5. The antireflection coating of claim 1, wherein the third layer has a refractive index greater than about 2.2.

6. The antireflection coating of claim 1, wherein the first layer comprises a material selected from $SnO_2$, ZnO, $ZrO_2$, $HfO_2$, $Nb_2O_5$, $Ta_2O_5$, $TiO_2$, $Sc_2O_3$, $Si_3N_4$, AlN, a first mixture of any two of these materials, and a second mixture of one of these materials with another material, each of the first mixture and the second mixture having an index of refraction greater than 1.9.

7. The antireflection coating of claim 1, wherein the first layer comprises an electrically conductive transparent material.

8. The antireflection coating of claim 7, wherein the first layer comprises ITO.

9. The antireflection coating of claim 1, wherein the second layer has an optical thickness less than $\lambda_0/4$.

10. The antireflection coating of claim 1, wherein the first layer has an optical thickness less than $\lambda_0/4$.

11. The antireflection coating of claim 1, wherein the fourth layer has an optical thickness about or slightly greater than $\lambda_0/4$.

12. The antireflection coating of claim 1, wherein the substrate has a refractive index less than 1.65.

13. The antireflection coating of claim 1, wherein the substrate is made of plastic.

14. The antireflection coating of claim 1, wherein the substrate is a CRT.

15. The antireflection coating of claim 1, where the first and third layers have different compositions.

16. The antireflection coating of claim 1, wherein at least one of the second and fourth layers is deposited by AC-magnetron sputtering.

17. The antireflection coating of claim 1, wherein the third layer has an optical thickness less than $\lambda_0/6$.

18. The antireflection coating of claim 17, wherein the third layer has an optical thickness less than $\lambda_0/7$.

19. The antireflection coating of claim 1, wherein at least one of the first, second, third and fourth layers comprises two or more sub-layers.

20. The antireflection coating of claim 19, wherein the third layer comprises at least two sub-layers, an optical thickness of the sub-layers, in combination, being less than $\lambda_0/4$, and an effective refractive index of the sub-layers, in combination, being greater than about 2.1.

21. The antireflection coating of claim 1, further comprising an absorbing layer.

22. The antireflection coating of claim 21, wherein the absorbing layer is adjacent to the third layer.

23. The antireflection coating of claim 21, wherein the absorbing layer comprises $NiVO_x$.

24. An antireflection coating for a transparent or semitransparent substrate consisting essentially of four optical interference layers, the coating comprising:
    a first layer adjacent to the substrate having a refractive index greater than about 1.9;
    a second layer having a refractive index less than that of the first layer;
    a third layer having a different composition than the first layer, the third layer having a refractive index greater than about 2.1 and greater than the refractive index of the first layer and an optical thickness less than $\lambda_0/4$, where $\lambda_0$ is a central wavelength corresponding to a spectral region bounded by or in the visible spectrum; and
    a fourth layer having a refractive index less than that of the first layer.

25. The antireflection coating of claim 24, wherein the first layer comprises an electrically conductive transparent material.

26. The antireflection coating of claim 25, wherein the first layer comprises ITO.

27. The antireflection coating of claim 24, wherein the first layer comprises a material selected from $SnO_2$, ZnO, $ZrO_2$, $HfO_2$, $Nb_2O_5$, $Ta_2O_5$, $TiO_2$, $Sc_2O_3$, $Si_3N_4$, AlN, a first mixture of any two of these materials, and a second mixture of one of these materials with another material, each of the first mixture and the second mixture having an index of refraction greater than 1.9.

28. The antireflection coating of claim 24, wherein the third layer has an optical thickness less than $\lambda_0/6$.

29. The antireflection coating of claim 28, wherein the third layer has an optical thickness less than $\lambda_0/7$.

30. The antireflection coating of claim 24, wherein the second and the fourth layers comprise silicon dioxide or silicon dioxide doped with less than 20% of another material.

31. The antireflection coating of claim 24, wherein the coating is deposited by magnetron sputtering.

32. The antireflection coating of claim 24, wherein the third layer comprises a material selected from $TiO_2$, $Ta_2O_5$, $Nb_2O_5$, a first mixture of any two of these materials, and a second mixture of one of these materials with another material, each of the first mixture and the second mixture having an index of refraction greater than 2.1.

33. The antireflection coating of claim 32, wherein the third layer comprises $TiO_2$.

34. The antireflection coating of claim 24, wherein the third layer has a refractive index greater than about 2.2.

35. The antireflection coating of claim 24, wherein the second layer has a refractive index less than that of the substrate.

36. The antireflection coating of claim 24, wherein the second layer has an optical thickness less than $\lambda_0/4$.

37. The antireflection coating of claim 24, wherein the first layer has an optical thickness less than $\lambda_0/4$.

38. The antireflection coating of claim 24, wherein the fourth layer has an optical thickness about or slightly greater than $\lambda_0/4$.

39. The antireflection coating of claim 24, wherein at least one of the first, second, third and fourth layers comprises two or more sub-layers.

40. The antireflection coating of claim 39, wherein the third layer comprises at least two sub-layers, an optical thickness of the sub-layers, in combination, being less than $\lambda_0/4$, and an effective refractive index of the sub-layers, in combination, being greater than about 2.1.

41. The antireflection coating of claim 24, further comprising an absorbing layer.

42. The antireflection coating of claim 41, wherein the absorbing layer is adjacent to the third layer.

43. The antireflection coating of claim 41, wherein the absorbing layer comprises $NiVO_x$.

44. The antireflection coating of claim 24, wherein the second and fourth layers have refractive indexes of about 1.56 or less.

45. An antireflection coating for a transparent or semi-transparent substrate consisting essentially of four optical interference layers, the coating comprising:

a first layer adjacent to the substrate having a refractive index greater than about 1.9;

a second layer having a refractive index less than that of the first layer;

a third layer having a refractive index greater than about 2.1 and an optical thickness less than $\lambda_0/4$, where $\lambda_0 4$ is a central wavelength corresponding to a spectral region bounded by or in the visible spectrum;

a fourth layer having a refractive index less than that of the first layer; and an absorbing layer adjacent to the third layer.

46. The antireflection coating of claim 45, where the first and third layers have different compositions.

47. The antireflection coating of claim 45, wherein the third layer has an optical thickness less than $\lambda_0/6$.

48. The antireflection coating of claim 47, wherein the third layer has an optical thickness less than $\lambda_0/7$.

49. The antireflection coating of claim 45, wherein the absorbing layer is between the second and third layers.

50. The antireflection coating of claim 45, wherein the absorbing layer comprises $NiVO_x$.

51. The antireflection coating of claim 45, wherein the second and fourth layers comprise silicon dioxide or silicon dioxide doped with less than 20% of another material.

* * * * *